United States Patent
Aijaz

(10) Patent No.: US 10,673,577 B2
(45) Date of Patent: Jun. 2, 2020

(54) METHOD FOR EFFICIENT RETRANSMISSIONS IN MULTI-HOP CONTROL NETWORKS

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/043,903

(22) Filed: Jul. 24, 2018

(65) Prior Publication Data

US 2020/0036483 A1    Jan. 30, 2020

(51) Int. Cl.
    *H04L 1/18*        (2006.01)
    *H04W 72/12*      (2009.01)
    *H04W 88/04*      (2009.01)

(52) U.S. Cl.
    CPC .......... *H04L 1/1854* (2013.01); *H04L 1/1861* (2013.01); *H04W 72/121* (2013.01); *H04W 88/04* (2013.01)

(58) Field of Classification Search
CPC ............. H04W 72/04; H04W 72/0406; H04W 72/0413; H04W 72/042; H04W 72/0426; H04W 72/0433; H04W 72/0446; H04W 72/12; H04W 72/121; H04W 72/1205; H04W 72/1215; H04W 72/1242; H04W 72/1247; H04W 72/1257; H04W 72/1263; H04W 72/1268; H04W 72/1273; H04W 72/1278; H04W 72/1284; H04W 72/1289; H04W 72/57; H04W 40/02; H04W 40/12; H04W 40/22; H04W 40/244; H04W 52/48; H04W 52/04; H04W 52/0406; H04W 52/0413; H04W 52/042; H04W 52/0426; H04W 52/0433; H04W 52/0446;
(Continued)

(56) References Cited

U.S. PATENT DOCUMENTS 6,788,702 B1   9/2004   Garcia-Luna-Aceves et al.
6,791,997 B2   9/2004   Beyer et al.
(Continued)

FOREIGN PATENT DOCUMENTS

JP    2008-270854 A    11/2008
JP    2009-188924 A     8/2009
(Continued)

OTHER PUBLICATIONS

Office Action dated Jan. 23, 2019 in co-pending U.S. Appl. No. 15/481,144.
(Continued)

*Primary Examiner* — Tri H Phan
(74) *Attorney, Agent, or Firm* — Oblon, McClelland, Maier & Neustadt, L.L.P.

(57) ABSTRACT

A method for re-transmitting data from nodes in a multi-hop wireless network to a control node, wherein each node is a child node to a corresponding parent node, each child node configured to communicate with the control node via its intervening parent node. The method comprises the control node determining or initiating determination of a transmission schedule for the nodes and the nodes re-transmitting previously transmitted data towards the control node using the schedule.

18 Claims, 7 Drawing Sheets

(58) Field of Classification Search
CPC ............... H04W 52/12; H04W 52/121; H04W 52/1205; H04W 52/1215; H04W 52/1242; H04W 52/1247; H04W 52/57; H04W 52/1263; H04W 52/1268; H04W 52/1273; H04W 52/1278; H04W 52/1284; H04W 52/1289; H04W 84/18; H04W 88/04; H04L 1/1854; H04L 1/1861; H04L 45/28; H04L 1/18

See application file for complete search history.

(56) References Cited

U.S. PATENT DOCUMENTS

| | | | |
|---|---|---|---|
| 7,440,436 B2 * | 10/2008 | Cheng | H04W 72/1278 370/310 |
| 8,199,635 B2 * | 6/2012 | Taylor | H04L 67/12 370/217 |
| 8,270,429 B2 * | 9/2012 | Chen | H04W 72/1236 370/447 |
| 8,542,579 B2 * | 9/2013 | Rong | H04L 47/522 370/229 |
| 9,923,832 B2 | 3/2018 | Wetterwald et al. | |
| 10,305,781 B2 * | 5/2019 | Jin | H04L 45/02 |
| 10,349,427 B2 * | 7/2019 | Aijaz | |
| 10,368,349 B2 * | 7/2019 | Aijaz | H04L 1/1887 |
| 10,455,598 B2 * | 10/2019 | Jin | H04W 24/04 |
| 10,462,808 B2 * | 10/2019 | Aijaz | H04W 72/085 |
| 10,542,540 B2 * | 1/2020 | Jin | H04L 5/0032 |
| 2007/0133455 A1 | 6/2007 | Kuchibhotla et al. | |
| 2008/0209301 A1 | 8/2008 | Chang et al. | |
| 2009/0040985 A1 | 2/2009 | Barnawi et al. | |
| 2009/0052429 A1 | 2/2009 | Pratt, Jr. et al. | |
| 2009/0067533 A1 | 3/2009 | Yuan et al. | |
| 2010/0110964 A1 * | 5/2010 | Love | H04W 72/1278 370/312 |
| 2011/0110345 A1 | 5/2011 | Heidari et al. | |
| 2013/0016600 A1 | 1/2013 | Hwang et al. | |
| 2013/0077555 A1 | 3/2013 | Gao et al. | |
| 2014/0241254 A1 | 8/2014 | Kaur et al. | |
| 2015/0049644 A1 | 2/2015 | Lee | |
| 2015/0109926 A1 | 4/2015 | Jin et al. | |
| 2016/0020979 A1 | 1/2016 | Thubert et al. | |
| 2016/0021006 A1 | 1/2016 | Vasseur et al. | |
| 2016/0021011 A1 | 1/2016 | Vasseur | |
| 2016/0021017 A1 | 1/2016 | Thubert et al. | |
| 2016/0044733 A1 | 2/2016 | Soriaga et al. | |
| 2016/0269096 A1 | 9/2016 | Thubert et al. | |
| 2018/0020447 A1 | 1/2018 | Thubert et al. | |
| 2018/0124812 A1 | 5/2018 | Thubert et al. | |
| 2018/0302908 A1 | 10/2018 | Aijaz | |
| 2019/0037578 A1 * | 1/2019 | Kim | H04W 72/085 |
| 2019/0159201 A1 * | 5/2019 | Jin | H04W 74/04 |

FOREIGN PATENT DOCUMENTS

| | | |
|---|---|---|
| JP | 2010-263297 A | 11/2010 |
| JP | 2013-534120 A | 8/2013 |
| JP | 2013-176118 A | 9/2013 |
| JP | 2015-233351 A | 12/2015 |

OTHER PUBLICATIONS

Office Action dated Aug. 16, 2018 in co-pending U.S. Appl. No. 15/487,163, 15 pages.

Office Action dated Oct. 2, 2018 in co-pending U.S. Appl. No. 15/487,079, 13 pages.

Office Action dated Feb. 19, 2019 in Japanese Patent Application No. 2018-022046, 11 pages (with unedited computer generated English translation).

Fan, G. et al., "Extended Abstract: a Bidirectional TDMA Protocol for Underwater Acoustic Sensor Networks" ACM Int. Conf. Underwater Networks and Systems, 2013, pp. 2.

Swamy, V. et al. "Cooperative Communications for High-Reliability Low-Latency Wireless Control" Proc. IEEE Int. Conf. Communications (ICC), 2015, pp. 7.

Scheible, G. et al., "Unplugged but Connected: Design and implementation of a Truly Wireless Real-Time Sensor/Actuator Interface" IEEE Industrial Electronics Magazine, vol. 1, No. 2, 2007, pp. 10.

Accettura, N. et al., "Decentralized Traffic Aware Scheduling in 6TiSCH Networks: Design and Experimental Evaluation" IEEE Internet of Things Journal, vol. 2, No. 6, 2015, pp. 17.

Duquennoy, S. et al., "Orchestra: Robust Mesh Networks Through Autonomously Scheduled TSCH" Proc. Int. Conf. Embedded Netw. Sensor Syst., 2015, pp. 14.

Soua, R. et al., "Wave: a Distributed Scheduling Algorithm for Convergecast in IEEE 802.15.4e TSCH Networks" Transactions on Emerging Telecommunications Technologies. v01. 27. No. 4, 2016, pp. 19.

Morell, A. et al. "Label switching over IEEE802.15.4e networks", Transactions on Emerging Telecommunications Technologies, vol. 24, No. 5, 2013, pp. 18.

* cited by examiner

METHOD FOR EFFICIENT RETRANSMISSIONS IN MULTI-HOP CONTROL NETWORKS

FIELD

Embodiments described herein relate generally to re-transmitting data from nodes in multi-hop networks.

BACKGROUND

Conventional industrial control systems are based on wired technologies like fieldbus systems and industrial Ethernet. Wireless technologies provide a low cost alternative with many additional benefits such as fast installation and commissioning, higher flexibility, ease of maintenance and increased troubleshooting capabilities. Recent advances in wireless technologies have led to the use of multi-hop wireless networks for (open-loop) monitoring of large-scale industrial systems. However, the use of multi-hop wireless networks for control applications is still at a nascent stage.

Multi-hop control networks are representative of wireless networked control systems in which control and feedback signals are exchanged in the form of information packets over a shared wireless medium, thereby closing a global control loop. The closed-loop control typically takes place between a controller and a spatially distributed system of sensors and actuators. Closed-loop control can also occur between controllers. This is referred to as control-to-control communication. Multi-hop control network find broad range of applications in legacy and emerging industrial systems, such as discrete manufacturing, process control, collaborative remote operation, remote control of automated guided vehicles, platooning of vehicles, and virtually coupled train systems—among many others.

Realizing closed-loop control over multi-hop wireless networks becomes particularly challenging with state-of-the-art wireless technologies. This is mainly due to the limitations of existing technologies in meeting the stringent requirements of closed-loop control applications. Typically, closed-loop control over wireless demands connectivity with very high reliability and very low latency. This is because packet losses and delays, which are dominant in wireless environments, have a detrimental effect on the stability of the control loop. Closed-loop control also involves bi-directional communication with cyclic traffic patterns. The cyclic information exchange demands highly deterministic connectivity which implies that the communication latency (between cycles) must have a very low variance. Besides, due to the presence of a large number of sensor and actuators, the requirement for highly scalable connectivity naturally arises.

In the following, embodiments will be described with reference to the drawings in which.

DETAILED DESCRIPTION

Figure 1:
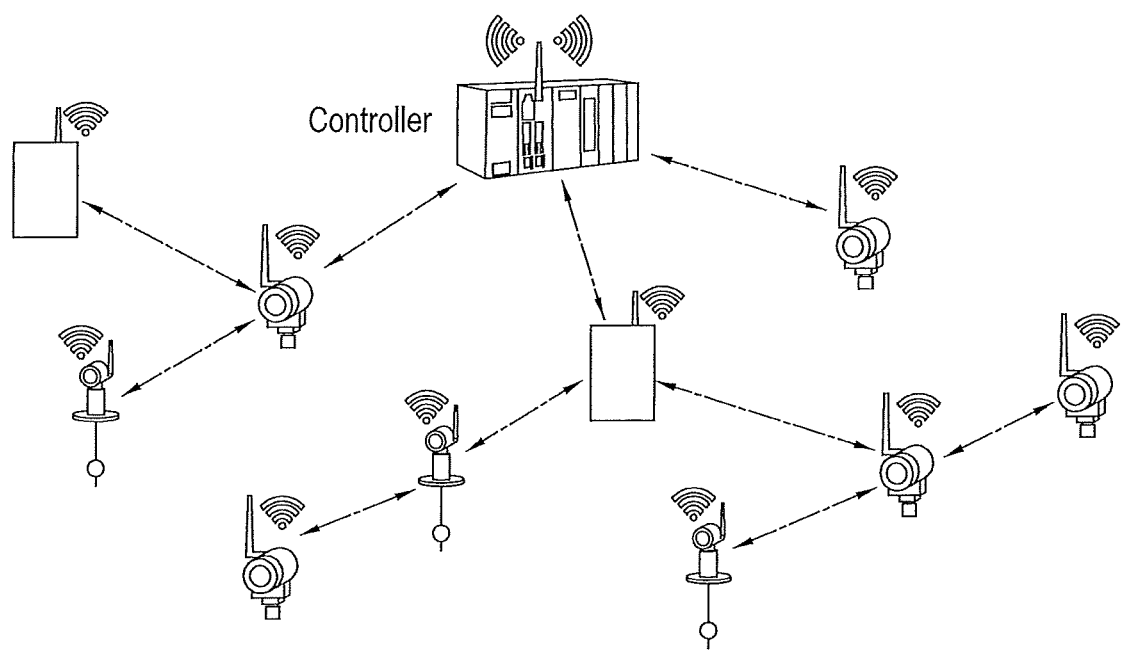
FIG. 1 illustrates a network model in which a retransmission technique of an embodiment can be used.

According to an embodiment there is provided a method for re-transmitting data from nodes in a multi-hop wireless network to a control node, wherein each node is a child node to a corresponding parent node, each child node configured to communicate with the control node via its intervening parent node, the method comprising:

the control node determining or initiating determination of a transmission schedule for the nodes; and the nodes re-transmitting previously transmitted data towards the control node using the schedule.

The schedule used for re-transmission may be a schedule previously used for transmitting data. Use of a pre-existing schedule eliminates the need to build a new schedule.

The re-transmission may take place over different frequency channel.

The repeating of the pre-existing schedule may either take the form of a re-transmission of all of the data once the initial transmission round has been completed. Alternatively the initial transmission schedule comprises duplicated transmission slots that allows repetition of each data transmission. This repetition may take place in the transmission slot that immediately follows the original transmission slot.

The schedule may be a TDMA schedule for bi-directional closed-loop control information exchange between the controller and the network nodes.

The method may further comprise the controller, following an unsuccessful attempt to transmit data according to a data transmission schedule, transmitting an indication of data packets or of a node of origin of data packets, wherein the data packets had been scheduled to be received but that failed to be delivered to the controller in the attempt to transmit data.

The re-transmission schedule may be built in a sequential manner, through local signalling between neighbouring nodes, for recovering failed transmissions after a complete round of bi-directional information exchange.

Each of the nodes may have a priority assigned to it and wherein when a node, upon receipt of the indication, determines that re-transmission of a data packet is required of it, request allocation of one or more uplink data transmission slots in accordance with the nodes priority.

One or more of the nodes may be individually paired with a relay node that can observe transmissions received by the node from its child nodes. The relay node is spaced apart from the control node by the same number of hops as the node with which it is paired. A parent node of the node sends an instruction to the relay node of the node to transmit the data that is to be re-transmitted to the parent node simultaneously with a re-transmission of the data by the node with which the relay node is paired.

The relay node may have stored the data that is to be re-transmitted in its buffer when overhearing a previous transmission of the data by its paired node. The re-transmission of the data by the relay node may use the buffered data.

One or more of the nodes may be individually paired with a relay node that can observe transmissions received by the node from its child nodes. The relay node may be spaced apart from the control node by the same number of hops as the node with which it is paired, wherein the nodes are configured to re-use a previous transmission schedule used in an unsuccessful attempt to transmit data. Only nodes that are required to re-transmit data participate in transmission in the schedule.

A node, upon receipt of the indication, may determine that it is the relay node of a node that is required to re-transmit data and transmits the data that is to be re-transmitted from its buffer in a transmission time slot of the node that is required to re-transmit the data.

Parent and child nodes may negotiate non-conflicting transmission timeslots for re-transmission.

According to another embodiment there is provided a method for re-transmitting data from nodes in a multi-hop wireless network to a control node, wherein each node is a child node to a corresponding parent node, each child node configured to communicate with the control node via its intervening parent node, the method performed in a relay node that is paired with another node. The method comprises upon receipt of an indication that the other node is required to re-transmit data, transmitting said data from a buffer to a joint parent node of the relay node and the other node simultaneously with a re-transmission of said data by the other node.

The method may further comprise receiving an indication of a time slot to be used for re-transmission from said parent node.

According to an embodiment there is provided a non-transitory computer storage medium storing computer executable instructions for performing, when executed by a processor, any of the above described methods.

According to an embodiment there is provided a multi-hop wireless network comprising a control node, wherein each node is a child node to a corresponding parent node, each child node configured to communicate with the control node via its intervening parent node. The network is configured so that:

the control node determines or initiates determination of a transmission schedule for the nodes; and the nodes re-transmitting previously transmitted data towards the control node using the schedule.

According to an embodiment there is provided a relay node for use in a network for re-transmitting data from nodes in a multi-hop wireless network to a control node, wherein each node is a child node to a corresponding parent node, each child node configured to communicate with the control node via its intervening parent node, the relay node paired with another node and configured to:

upon receipt of an indication that the other node is required to re-transmit data, transmitting said data from a buffer to a joint parent node of the relay node and the other node simultaneously with a re-transmission of said data by the other node.

The network/system may be an industrial control systems or a smart metering network.

The node may be embodied in a Bluetooth chipsets or may be a wireless access point.

Enabling control over multi-hop wireless networks creates multi-hop control networks which are one realization of the wireless networked control systems. The characteristic feature of multi-hop control networks is that control and feedback signals are exchanged in the form of information packets over a shared wireless medium thereby closing a global control loop. Such closed-loop control typically takes place between a controller and a spatially distributed system of sensors and actuators. Multi-hop control networks have a broad range of applications in various industrial systems. Realizing multi-hop control networks with state-of-the-art wireless technologies becomes particularly challenging, mainly due to the limitations of existing technologies in meeting the stringent communication requirements of closed-loop control applications.

A high-performance wireless solution for closed-loop control over multi-hop wireless networks, termed GALLOP, is described in co-owned U.S. patent application Ser. No. 15/487,079, the entirety of which is incorporated herein by this reference. GALLOP implements several novel techniques for achieving very low latency and very high reliability along with scalable and deterministic performance. Retransmissions at the medium access control (MAC) layer can be particularly important for providing high reliability. However, retransmissions in multi-hop wireless networks become particularly challenging, especially under strict latency constraints. Disclosed herein are efficient techniques for handling MAC layer retransmissions in multi-hop wireless networks. These techniques are applicable to GALLOP but can equally be applied to improve the performance of any schedule-based wireless protocol. One application (besides GALLOP) is the 6TiSCH technology which has been widely used for smart metering applications.

Characteristics of the retransmission techniques disclosed herein include:

ODR Trade-off—MAC layer retransmissions in multi-hop control networks based on schedule-based protocols lead to the overhead-determinism-reliability (ODR) trade-off. The disclosed techniques have been designed to optimise ODR perspective.

Cooperative Multi-user Diversity—Diversity is an enabler for achieving high reliability in wireless networks. The disclosed techniques harness cooperative multi-user diversity which integrates cooperative diversity and multi-user diversity techniques.

Opportunistic Network Coding—Network coding is another enabler for high reliability in wireless networks. The disclosed techniques exploit opportunities for network coding in the underlying multi-hop wireless network. Further, network coding is integrated with cooperative multi-user diversity for enhanced reliability performance.

Efficient Relay Selection—To harness cooperative multi-user diversity, certain nodes act as relays. Selecting suitable relays becomes particularly challenging in multi-hop wireless networks. The disclosed retransmission techniques also employ an efficient relay selection mechanism.

Figure 2:
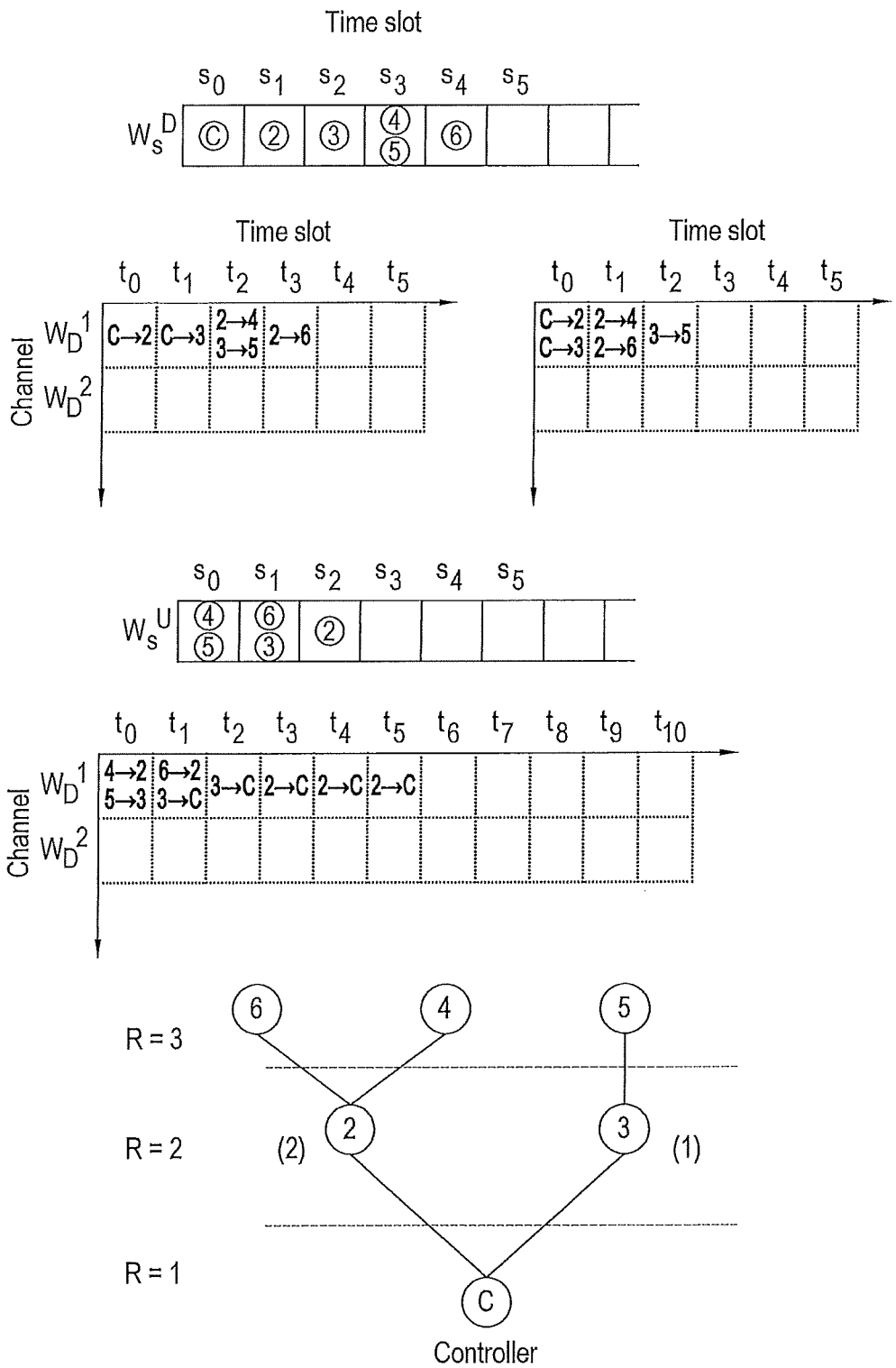
FIG. 2 illustrates a known method of distributed scheduling.

A multi-hop control network 100 in which embodiments can be implemented is depicted in FIG. 1. In FIG. 1 an industrial controller 110 and multiple devices 120, 130 and 140 exchange bi-directional information over the multi-hop wireless network 100. The access point is located with the industrial controller. A reference to downlink communication is a communication extending in the direction from the controller 110 (access point) to devices/nodes 120/130/140, while a reference to uplink communication refers to communication from devices/nodes 120/130/140 towards the controller 110. In an embodiment a low cost routing protocol such as RPL is running at the network layer. Based on the routing protocol, a tree topology is constructed which provides multi-hop connectivity between the controller and the devices. In the example the Physical (PHY) layer is based on IEEE 802.15.1 specifications which are the basis for well-known Bluetooth technology. In embodiments the MAC layer is based on time division multiple access (TDMA), frequency division duplexing (FDD), and frequency hopping. A distributed schedule has been built based on the protocol operation of GALLOP. One realization of such a distributed schedule is shown in FIG. 2. The complete protocol details for GALLOP are disclosed in co-owned application U.S. Ser. No. 15/487,079 filed on 13 Apr. 2017, the entirety of which is incorporated herein by reference. It is emphasised that the present disclosure is not limited for use with GALLOP and that, alternatively or additionally, the disclosure can be used with 6TiSCH.

For ease of reference a method used by GALLOP for building a distributed schedule is discussed in the following with reference to FIG. 2. The top schedule $W_S^D$ depicts the signalling during the first phase for building the downlink schedule. This is followed by the downlink schedules for two scenarios: unicast messaging and broadcast messaging. This is followed by the schedule for the signalling for building the uplink schedule. Finally, the uplink schedule is depicted.

Firstly, we consider the scenario where the controller has a single command message for all the nodes in the network.

As distributed scheduling requires nodes to exchange information about their schedules, a system must be laid down to avoid signal clashes during scheduling and to help avoid conflicting communications during downlink transmission. Accordingly, during downlink scheduling each node is assigned a scheduling timeslot from a downlink signalling channel (WSD), during which the node may send signals to perform downlink scheduling to schedule transmissions to the downlink channel (WD).

During the scheduling timeslot for a given node, the node utilises its own knowledge of the local network to choose a scheduled timeslot for downlink transmission. Having said this, the node may have an incomplete view of the local network and overall schedule, and may therefore schedule a transmission that may conflict with other transmissions in the area. To avoid this, the node sends a request for slots (RFS) message to its parent node. The parent node uses its own knowledge of the local network and schedule to determine whether transmitting during the proposed timeslot would interfere with any neighbouring transmissions. The parent node then either sends an assign (ASG) message to confirm that the proposed scheduled transmission is allowed, or allocates an alternative timeslot based on its knowledge of the local network. This helps to avoid nodes scheduling conflicting transmissions.

Each node (including the control node) schedules transmissions according to the following rules:

Rule 1D: Any node k selects the minimum possible timeslots on the available channels, where it finds no conflict as per its local knowledge.

Rule 2D: Any parent node k', on receiving a request for slots (RFS) message, will confirm the requested allocation, if it finds no conflict and if the requested allocation provides the minimum possible latency as per its local knowledge. Otherwise, it will respond with an updated allocation assigned based on Rule 1D and a requirement to provide the minimum possible latency.

Rule S1D: Any parent node k' will assign non-conflicting signalling slots to its child nodes based on its local knowledge.

Rule S2D: Any node k, on detecting a collision on a signalling slot, will retransmit the RFS message in the next available signalling slot based on its local knowledge.

In one implementation the minimum possible timeslots on the available channels is the earliest set of timeslots available on one or more of the available channels.

The scheduling mechanism begins at the control node. The controller picks up the first slot s0 of the downlink signalling channel (WSD). As no transmissions have been scheduled yet, the controller does not need to send any signals to determine whether its schedule conflicts with that of another node. Accordingly, the control node selects timeslots for downlink transmission and broadcasts the information about the selected timeslots to its child nodes.

As discussed previously, the controller can either schedule its child nodes in distinct time slots or in a broadcast manner; therefore, it picks either timeslots t0 and t1 (for separate transmissions to nodes 2 and 3), or timeslot t0 only (for a broadcast transmission to both nodes 2 and 3 at the same time).

Furthermore, the controller assigns signalling priorities to its child nodes and conveys this scheduling information for accessing the signalling slots. One way to convey priority information is to embed the MAC addresses or IDs of the child nodes, in order of priority, in the MAC header. In the present arrangement, priority is assigned based on node ID. Node 2 is given therefore given priority over node 3.

Based on information received in signalling slot s0 node 2 determines that it has highest priority. Therefore, it picks up the second signalling slot, s1, and sends a Request-for-Slots (RFS) message to its default parent (the control node). Node 2 can either request a single timeslot or multiple timeslots (according to how many child nodes it has). This will depend on whether broadcast or distinct scheduling is being implemented.

If distinct scheduling is being implemented, Node 2 would be aware that it is due to receive its message from the control node in timeslot t0 and that conflicting transmissions from the control node are scheduled to occur during timeslots t0 and t1. It would therefore pick the next available timeslots (t2 and t3) for separate transmissions to Nodes 4 and 6.

In the broadcast scheduling scenario, Node 2 would be aware that it is due to receive its message in t0, but that no conflicting transmissions are currently scheduled during t1. It therefore picks timeslot t1 for a broadcast transmission to all its child nodes.

Based on the RFS, the default parent, which is the controller in this case, determines whether the proposed schedule would conflict with another transmission that has already been scheduled. In this case, there is no conflict, so the control node responds back with an Assign (ASG) message to confirm the allocation, as per Rule 2D.

Node 2 therefore schedules the proposed downlink transmissions and sends the schedule to its child nodes. Furthermore, node 2 assigns priorities to its child nodes for accessing the signalling slots and conveys this information along with the next available signalling slot information (which is s3 in this case). It is important to let the child nodes know which is the next available signalling slot as they would have no knowledge of the signalling the is occurring uplink of them. Accordingly, if this was not conveyed the child nodes would begin signalling in slot s2, at the same time as node 3, which may cause collisions at nodes 2 and/or 3.

Similarly, based on the received information in signalling slot s0, node 3 determines that it has second highest priority. Therefore, it picks up the second signalling slot, s2, and sends an RFS message requesting timeslots and assigning priorities to its child nodes.

Node 3 requires one timeslot. In the present case node 3 is out of range of transmissions from Node 2. It is therefore not aware of the transmissions scheduled for Node 2. RFS messaging to parent nodes therefore helps to avoid conflicting transmissions.

In the scenario where separate transmissions to child nodes are utilised, Node 3 would be aware that conflicting transmissions are scheduled by the control node in t0 and t1. Accordingly, Node 3 picks the next available timeslot, t2, and communicate this to the control node via an RFS message. The control node is aware that Node 2 is scheduled to transmit in t2; however, as Nodes 2 and 3 are out of communication range, they may transmit in the same slot without conflict. Accordingly, the control node sends an assign (ASG) message to confirm that Node 3 may schedule transmission to Node 5 in t2.

In the scenario where broadcast messages are being utilised, Node 3 would be aware that the control node is scheduled for downlink transmission in t0. Having no knowledge of the scheduled transmissions for Node 2, Node 3 would pick t1 for its transmission to Node 3. This would be reported to the control node in an RFS message. As Node 2 and Node 3 are outside of communication range from each other, the control node would accept this proposed schedule and issue an assign the message.

Once the downlink transmission from Node 3 has been scheduled, Node 3 assigns the next signalling slot s3 to node 5. It should be noted that Nodes 4 and 5 are assigned the same signalling slot (s3); however, there is no conflict as Nodes 3 and 5 are outside of the communication range of Nodes 2 and 4.

Note that, in this case Node 3 is out of the communication range of node 2. However, if that was not the case, Node 3 would have picked timeslots t2 or t4, due to the information received in signalling slot s1. Furthermore, Node 3 would have assigned signalling slot s5 to Node 5 based on Rule S1D.

When the leaf nodes (the nodes that have no child nodes) are reached, each leaf node informs its neighbouring nodes that it has no child nodes to schedule. Node 4 uses signalling slot s3, whilst Nodes 5 and 6 use signalling slots s3 and s4 respectively, to inform neighbouring nodes that they have no child nodes to schedule. Finally, in case of a collision on a signalling slot, a node will retransmit the RFS message as per Rule S2D.

Next we explain the scenario where the controller has distinct command messages for all the nodes in the network. Note that building a distributed schedule in such a case requires complete network connectivity information at the controller or partial network connectivity information at each node in the network. Based on this assumption, the proposed method of building DL schedule can be extended to transmit distinct command messages for all network nodes.

The second phase is of downlink data transmission. After completing the signalling exchange, downlink data transmission begins as per the built downlink schedule. Note that the closed-loop cycle begins with downlink data transmission. Hence, the duration of downlink signalling phase does not affect the cycle time. After completing the downlink data transmission, a controller can send a Build command, using the downlink schedule, for initiating the uplink scheduling process.

The third phase is of signalling for building uplink schedule. Unlike the downlink case a node requests timeslots from its default parent. A priority is assigned to each node depending on its rank, traffic, and ID. Alternatively, the priority information obtained during the downlink signalling phase can be adopted by the nodes in the network. The schedule build up phase starts from leaf nodes in a sequential manner. The overall scheduling process follows certain rules, which are stated as follows.

Rule 1U: Any node k, on receiving the Build command, will start the uplink scheduling process, if and only if, it is a leaf node.

Rule 2U: Same as Rule 1D but for uplink case.

Following Rules 1U and 2U, nodes 4 and 5, pick up timeslot t0 (of the uplink channel) and send a Request-for-Slots (RFS) message to their default parents in a signalling slot s0. The default parents, which are nodes 2 and 3 in this case, will respond back with an Assign (ASG) message to confirm the allocation as per Rule 3U, which is stated as follows.

Rule 3U: Any parent node k', on receiving an RFS message, will confirm the requested allocation, if and only if it finds no conflict as per its local knowledge. Otherwise, it will respond with an updated allocation based on Rule 2U.

The neighbouring nodes overhear the ASG messages and maintain a record of timeslot allocation. Since node 6 overheard the ASG message for node 4, it will pick up timeslot t1 and send an RFS message to node 2 in the next signalling slot s1. Similarly, after scheduling node 5, node 3 will request timeslots t1 and t2 from the controller, in the signalling slot s1. Since the respective default parents find no conflict, they will confirm the requested allocation. After scheduling its child nodes, node 2 requests timeslots t2, t3, and t4, from the controller, in the signalling slot s2, based on its local knowledge. However, as timeslot t2 is already allocated to node 3, the controller responds back with updated allocation by assigning timeslots t3, t4, and t5.

Finally, in order to enable parallel transmissions, we introduce the following two rules.

Rule 4U: Any node k on overhearing an ASG message from a node j, whose rank is lower than its own, will update its local knowledge and forward this ASG message to its default parent, if and only if k is the default parent of j.

Rule 5U: Any parent node k', on receiving an RFS message, will confirm the requested allocation based on Rule 3U AND the possibility of a parallel transmission based on its local knowledge.

The fourth phase is of uplink data transmission. After completing the signalling exchange, uplink data transmission begins as per the built uplink schedule. Note that the overall cycle time is equal to 13 timeslots as compared to 10 timeslots for the centralised case. However, this cycle time is for the ideal scenario when there are no MAC layer retransmissions.

Based on the built schedule, bi-directional information exchange takes place between the controller and the devices. There is a finite probability that the uplink or downlink transmissions fail due to various factors, for example, external interference. It is particularly important to retransmit the failed transmissions. However, retransmissions in multi-hop control networks become particularly challenging owing to a trade-off between overhead, determinism and reliability (the aforementioned ODR trade-off). Besides, retransmissions require additional resources. Three different techniques for efficiently handling MAC layer retransmissions in GALLOP are disclosed herein:

Transmission Schedule Duplication
Retransmission Scheduling
Transmission Schedule Extrapolation These techniques are explained in the following.

Transmission Schedule Duplication

The first retransmission technique is one realization of the packet duplication functionality in wireless networks and is performed irrespective of whether data has been lost in the original transmission. The technique integrates channel diversity with packet duplication. The two transmissions of the same packet at two different time instances and on two different frequencies provides high reliability. The main motivation for duplicating the schedule is to guarantee deterministic performance. Besides, duplicating the schedule does not generate any extra overhead in terms of re-building the schedule for handling retransmissions. The schedule duplication operation with channel diversity can be achieved in two different ways.

Option 1

Figure 3:
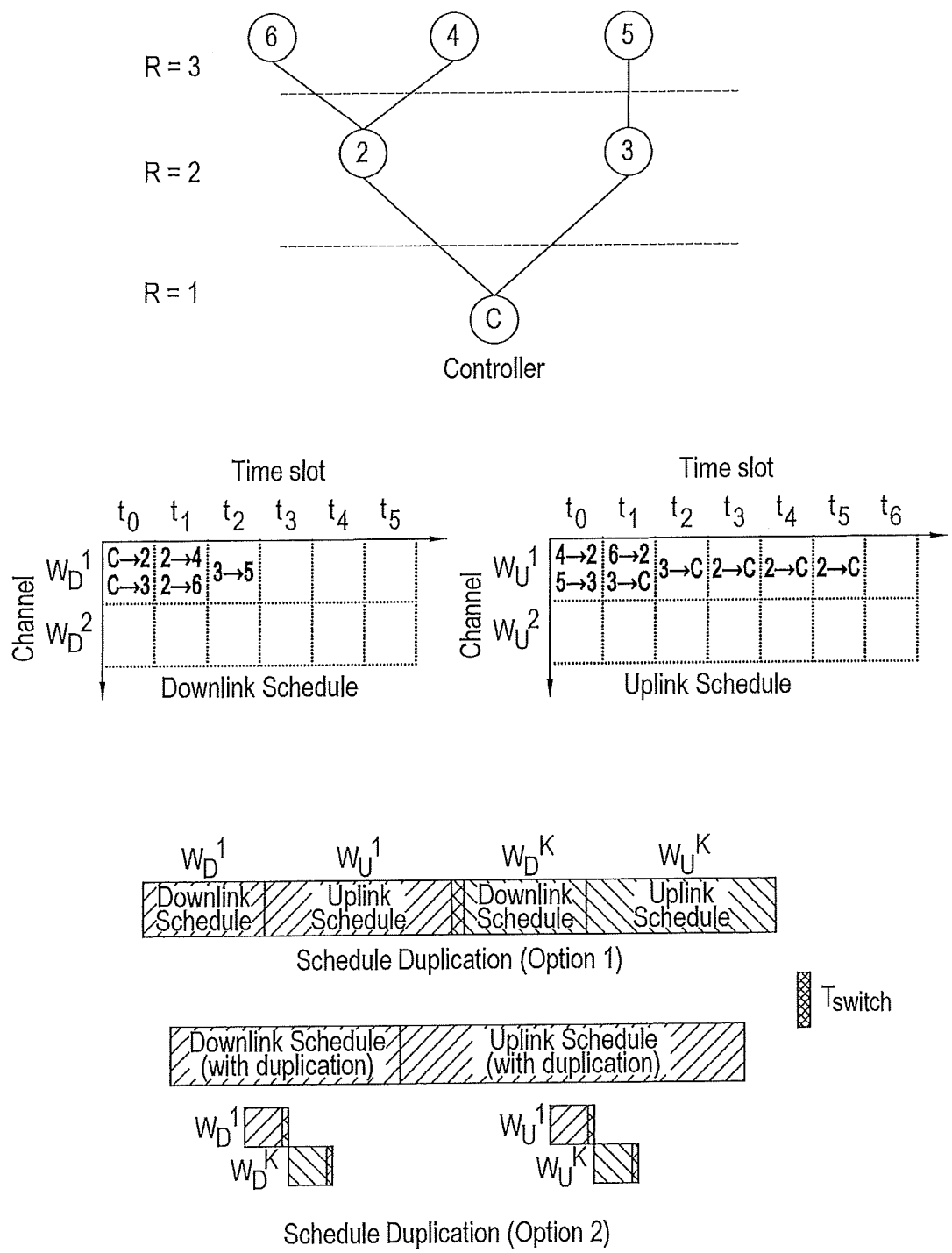
FIG. 3 illustrates schedule duplication techniques.

Consider the scenario depicted in FIG. 3 wherein a schedule has been built for both downlink ($W_D$) and uplink ($W_U$), for the topology shown therein. The first round of transmissions takes places as per the built schedule. In the second round, the downlink and uplink data transmission phases are repeated, as per the existing schedule, with each phase going on a different channel as compared to that in the first round. Note that there is a fixed channel switching delay between individual rounds. While this approach improves the reliability in a deterministic manner, it also increases the latency by a factory of 2. It is also possible to repeat the schedule more than once as long as the latency bound is not violated.

Option 2

As before, consider the scenario depicted in FIG. 3, wherein a schedule has been built for the topology shown therein. In this case, to realize packet duplication functionality, the schedule is built in a manner to account for such duplication, instead of duplicating the schedule. During the schedule build-up phase, each node requests one extra timeslot per transmission as compared to the case of no duplication. The rationale is that the extra timeslot (per transmission) is used for duplicate transmission. To incorporate channel diversity, the second transmission of the same packet is done on a different channel. This requires a fixed channel switching delay between adjacent timeslots. This approach provides higher reliability in a deterministic manner. However, its latency could be lower than the previous option due to the fact that GALLOP exploits opportunities for parallelising transmissions in the schedule. This is, for example, evident from time slots $t_0$ and $t_1$ of the original uplink (WU) transmission schedules shown in FIG. 3. As can be seen from the figure, in both time slots two nodes (nodes 4 and 5 in time slot $t_0$ and nodes 6 and 3 in time slot $t_1$) transmit synchronously to their respective parent nodes. This is possible as the synchronously transmitting nodes are not within each other's interference range.

In both options for realising schedule duplication functionality, the channel information can be embedded in the downlink signalling information, sent from the parent node to child nodes.

Retransmission Scheduling

The second retransmission technique relies on building a schedule for handling retransmissions. Further, this technique exploits cooperative multi-user diversity and opportunistic network coding techniques. In multi-hop control networks of embodiments, any arbitrary parent node needs to forward its own control information along with that of its child nodes. In the embodiment a parent node always maintains a certain order of transmission on the allocated timeslots. It always uses the first timeslot for its own control information. This is followed by the control information of the child nodes in the order of priorities assigned during the transmission schedule build up phase. For instance, in case of the schedule built in FIG. 2, node 2 will use timeslot t3 for forwarding its own control information, timeslots t4 and t5 for forwarding the information of nodes 4 and 6, respectively. Further, each parent node enumerates the packets in the sequence of transmission. For example, node 2 will mark its transmissions in timeslots t3, t4, and t5 as 1, 2, and 3, respectively.

In order to exploit cooperative multi-user diversity, GALLOP relies on certain nodes to act as relays for other nodes. The method for selecting a relay node is described later. The relay node for any arbitrary node is selected by its parent node from the set of its child nodes. The relay nodes overhear during the transmission schedule phase and buffer the overheard packets from the nodes for which they act as relays.

Figure 4:
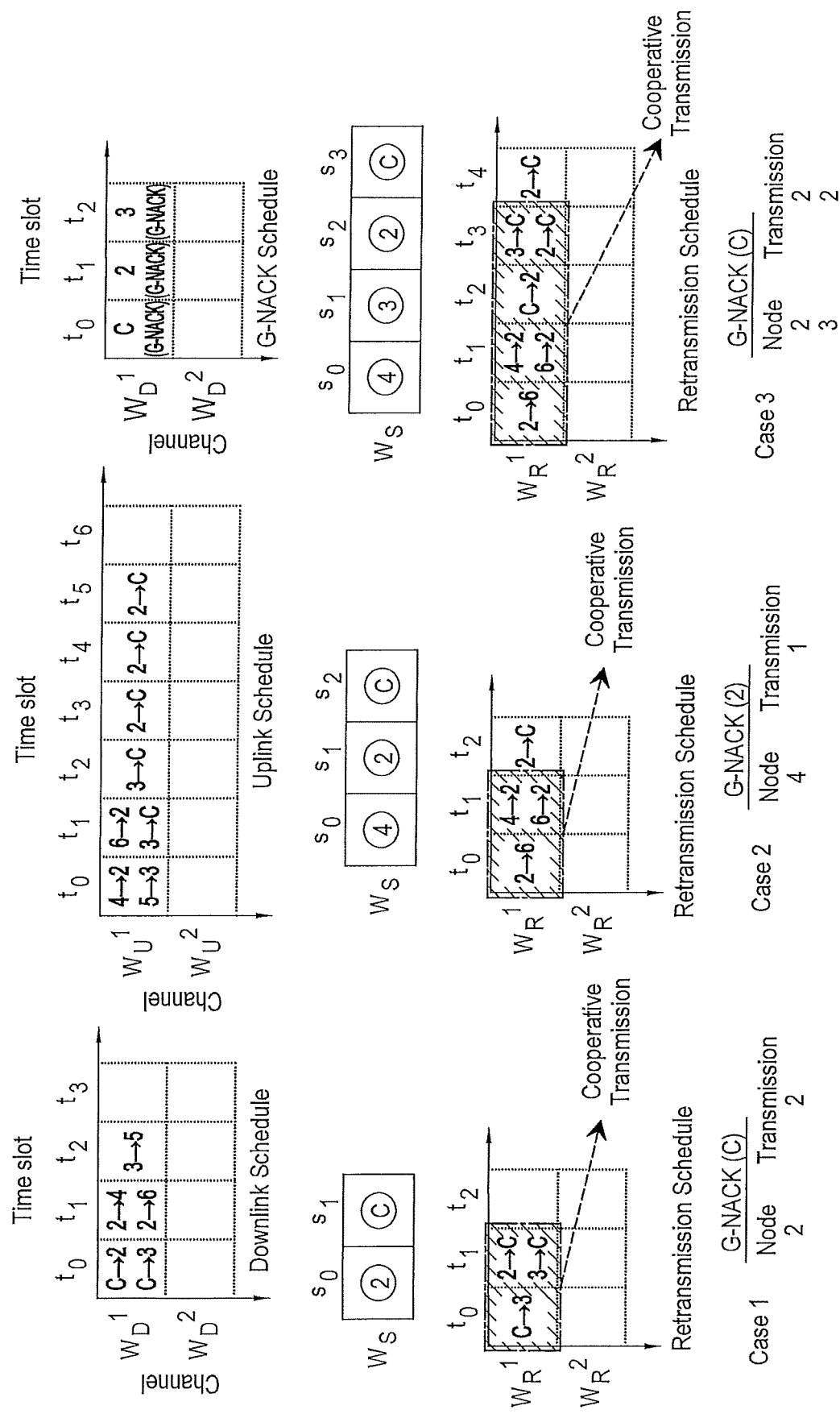
FIG. 4 illustrates a retransmission techniques in the same topology as that used in FIG. 3.

In embodiments the need for building a retransmission schedule is ascertained by the controller. At the end of the transmission schedule, the controller determines if a transmission from any of its child nodes is missing. Note that the missing transmission could be of the controller's child or of any other node further away in the topology. If a transmission is found missing by the controller, it generates a Group Negative Acknowledgement (G-NACK) message which contains the ID of the node with failed transmission along with the number of its missing transmission. The G-NACK is sent on the downlink schedule. The retransmission scheduling technique is further explained by distinguishing the following cases which are illustrated in FIG. 4.

Case 1

Assume that, at the end of the transmission schedule, the 2nd transmission from node 2 was missing at the controller. Therefore, the controller sends a G-NACK message to its child nodes in the first timeslot of the downlink schedule. Based on the G-NACK node 3 determines that it does not need to engage in the retransmission scheduling phase. However, node 2 needs to participate in the retransmission scheduling phase to recover its missing transmission. It knows that the 2nd transmission (as indicated in the G-NACK) was meant to be used for forwarding node 4's information. Therefore, this transmission could be in its own buffer, provided the transmission from node 4 to node 2, in timeslot t0 of the uplink schedule phase was successful. In this case, we assume that the transmission was available in its buffer. Therefore, it sends an empty G-NACK to its child nodes in the second timeslot of the downlink schedule. The empty G-NACK notifies its child nodes that their transmissions were successful. Similarly, node 3 sends an empty G-NACK to node 5 in the third timeslot of the downlink schedule. After the end of the downlink schedule phase, all nodes switch to the signalling channel.

Rule S1R: Any non-leaf node k will access the signalling channel, in the lowest possible available slot, if it has the missing transmission in its own buffer. Based on Rule S1R, node 2 will access timeslot s0 of the signalling channel to request timeslots (from its parent node) for the missing transmission. In order to exploit cooperative multi-user diversity, each node will request two timeslots for every missing transmission. Therefore, node 2 will request timeslots t0 and t1 on the retransmission channel, by sending a request for slot (RFS) message, from the controller. If the controller does not find any conflict on the requested allocation, it will confirm the requested allocation by sending an assign (ASG) message. Details about RFS and ASG related signalling can be found in co-pending U.S. patent application Ser. No. 15/487,079, which is hereby incorporated by reference in its entirety. After successful handshake for building the retransmission schedule, the controller terminates the scheduling phase by sending a specific downlink signalling message.

Rule S2R: The controller terminates the signalling for building a retransmission schedule after it has allocated timeslots for all the missing transmissions.

After termination of the retransmission signalling phase, nodes switch to the retransmission channel (which could be the uplink channel or any other channel). Recall that node 2 requested two timeslots. The first timeslot is used for parent to relay communication. In the example node 3 is the default relay for node 2. Therefore, it is likely to have the 2nd transmission of node 2 in its buffer. The missing transmission can be recovered through various types of cooperative transmissions.

In one scenario, both nodes 2 and 3 (relay) transmit the missing information, in the second timeslot ($t_1$), at the same time to the controller. This may provide a cooperative diversity gain through constructive interference which increases the robustness of transmission.

In second scenario, network coding is integrated with cooperative diversity such that both nodes 2 and 3 encode the missing information with any a priori information known to the controller. By encoding the message with information that is already known to the receiver the error probability of the message is reduced when compared to the uncoded message. Let, $X_{22}$ denote the missing transmission from node 2. It creates a new message $X_n = X_{22} + X_C$, wherein $X_C$ is the earlier mentioned a priori information. it will be appreciated that network coding does not have to rely on a summation of the message with a priori information and may instead combine the message with the a priori information in a different way known to the receiver. Similarly, node 3 encodes $X_{22}$ (which is available in its buffer). Simultaneously receiving $X_n$ from both nodes 2 and node 3 in timeslot $t_1$ may provide a cooperative diversity gain through constructive interference which increases the robustness of transmission.

In a third scenario, cooperative multi-user diversity is achieved through a realisation of cooperative physical layer network coding (CPNC). In this case, both nodes 2 and 3 transmit $X_{22}$ at the same time during timeslot $t_1$. The controller decodes the missing information based on an a priori mapping for interpreting the combined received signal. The mapping ensures that the received message is successfully decoded if both nodes 2 and 3 transmit the same information. For example, if the symbol transmission from both nodes 2 and 3 is '1' then the composite symbol received at the controller would be '2'. The mapping function at the controller would deduce the received transmission as '1'. This could be achieved through an XNOR operation on the individual components of the combined received signal.

In the fourth scenario, the relay node, i.e., node 3, performs a simple network coding (SNC) operation and transmits this information to the controller in timeslot $t_1$. The SNC operation is realised by encoding $X_{22}$ with any a priori information known to the controller. Unlike the previous cases, only node 3 will be active in timeslot $t_1$.

Case 2

Assume that, at the end of the transmission schedule, the 2nd transmission from node 2 was missing at the controller. However, unlink the previous case, the missing transmission is not available in buffer of node 2. Therefore, node 2 sends a G-NACK to its child nodes highlighting that the 1st transmission from node 4 is missing. At the end of the G-NACK schedule, nodes switch transmission to the signalling channel. We assume that node 4 had the missing packet in its buffer. Therefore, it request two timeslots from its parent 2 in timeslot s0 of the signalling channel. As the transmission from node 4 needs to be forwarded to the controller, node 2 requests one timeslot from the controller in timeslot s1 of the signalling channel. After allocating timeslots to node 2, the controller terminates the retransmission signalling phase.

Rule S3R: Any arbitrary parent node (not a controller) with a failed transmission from any of its child nodes will access the signalling channel after it has allocated timeslots for the missing transmission.

In the embodiment node 6 is the default relay for node 4. Therefore, in timeslots t0 node 2 instructs node 6 to transmit the failed transmission of node 4 from its buffer in time slot t1. Time slot t1 is then used for cooperative transmission to recover the failed transmission of node 4. After that timeslot t2 is used to forward the information to the controller. Since cooperative multi-user diversity is not feasible for the transmission in timeslot t2, node 2 will perform a SNC operation to improve its robustness.

Case 3

Assume that at the end of the transmission schedule, the 2nd transmission from node 2 and the 2nd transmission from node 3 were missing at the controller. Further, we assume that the 2nd transmission from node 2 was not available in its buffer. On the other hand, the 2nd transmission from node 3 was available in the buffer of node 2. In the embodiment node 3 is the default relay for node 2 and vice versa. A similar process is followed in this case to build a retransmission schedule. Since node 3 would have received the G-NACK from the controller indicating the missing transmission from node 2, it will defer access to the signalling channel until timeslot s1. Node 4 accesses timeslot s0 to request timeslot t0 and t1. As node 2 finds no conflict, confirms the requested allocation. As node 2 has received the G-NACK from the controller, indicating the missing transmission of node 3, it defers its access to the signalling channel until timeslot s2. Node 3 is assigned timeslots t2 and t3, irrespective of its requested allocation. In time slot t2 the controller instructs node 2 to re-transmit the re-transmission data of node 3. In time slot t3 nodes 2 and 3 cooperatively re-transmit this data.

Similarly, node 2 is assigned timeslot t4 by the controller. In this time slot the re-transmission data provided by nodes 4 and 6 in time slot t1 is re-transmitted by node 2 to the controller. After allocating the timeslots for all missing transmissions, the controller terminates the retransmission signalling phase. The missing transmissions are recovered through cooperative transmissions as explained earlier.

Case 4

This case is similar to the Case 2 described; however, in this case node 4 does not have the missing transmission in its buffer. This could potentially occur if the downlink transmission from node 2 to node 4 failed. As a result, node 4 did not transmit in the uplink. Therefore, after receiving a G-NACK from node 2, node 4 determine the need for downlink retransmission. In this case, node 4 will request three timeslots. The first timeslot (t0) is used for parent to relay communication. In this case node 2 will inform node 6 of the need for downlink transmission. In the second timeslot (t1), both the parent and the relay node cooperatively retransmit the downlink information to increase its robustness. The third timeslot (t2) is used by node 4 to transmit the uplink information.

The retransmission scheduling technique is attractive as it provides high reliability through cooperative multi-user diversity. However, it also encompasses a non-deterministic signalling component. Besides it has the associated overhead of building the retransmission schedule.

Transmission Schedule Extrapolation

The third retransmission technique aims to combine the benefits of the previous two techniques. It extends the transmission schedule for recovering the missing transmissions through cooperative multi-user diversity without the need for explicitly building a retransmission schedule. This is achieved by embedding some extra information in the G-NACKs. As before, the need for retransmission is ascertained by the controller. However, the retransmission are enabled through the previously built transmission schedule. Note that the G-NACKs are sent on the downlink schedule.

Figure 5:
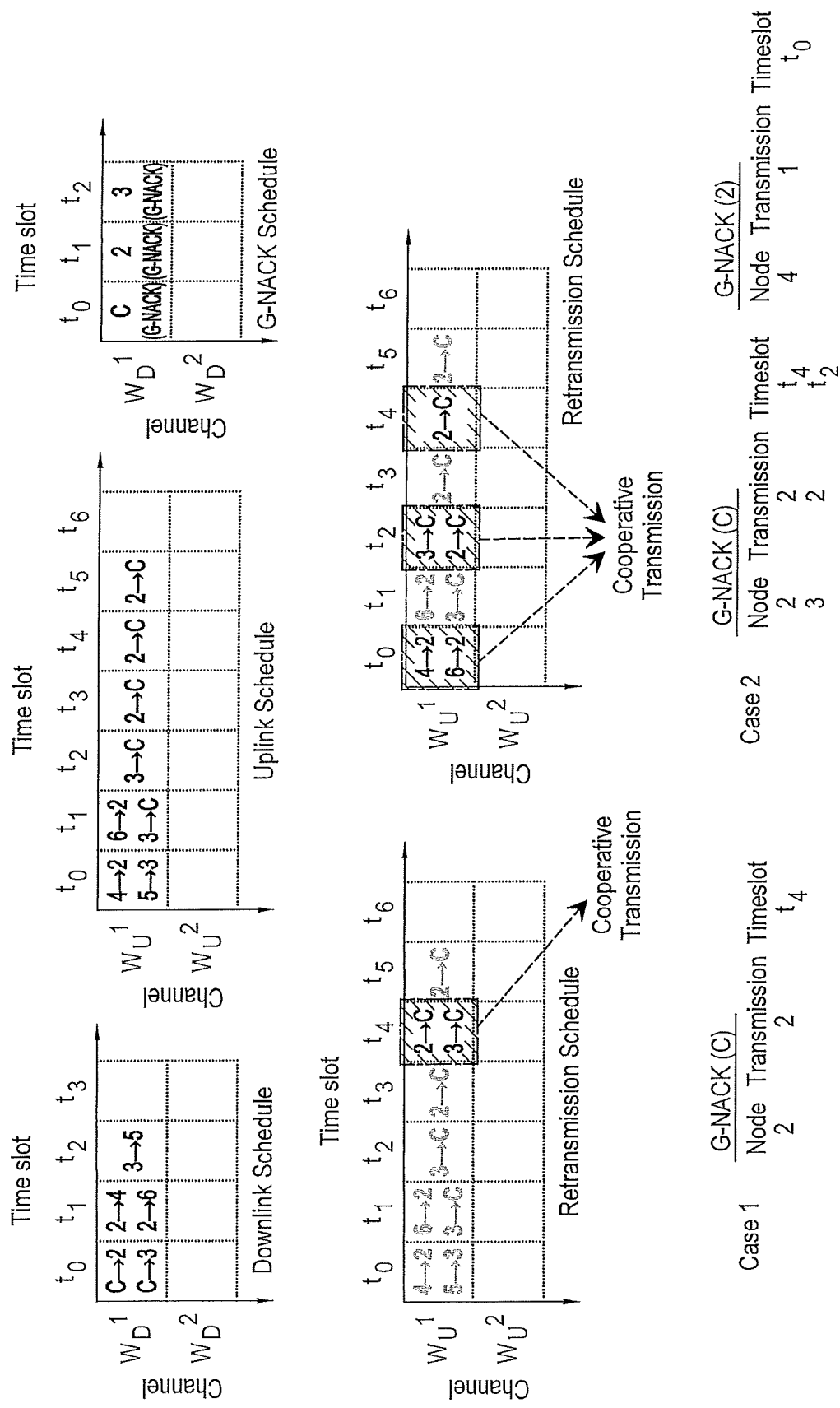
FIG. 5 illustrates a schedule extrapolation techniques in the same topology as that used in FIG. 3.

The technique, which is illustrated in FIG. 5, is explained by distinguishing the following two cases.

Case 1

Assume that, at the end of the transmission schedule, the 2nd transmission from node 2 was missing at the controller. Moreover, this transmission was available in the buffer of node 2. Therefore, the controller generates a G-NACK indicating the missing transmission from node 2. Unlike the previous technique, the controller also embeds the timeslot (and potentially channel) information, in the transmission schedule, for this transmission. Note that this transmission was allocated timeslot t4 in the original schedule. Similar to the previous technique, node 3 is the default relay for node 2. Therefore, the G-NACK from the controller also informs node 3 to engage in a cooperative transmission at timeslot t4. Hence, in timeslot t4 of the retransmission schedule, node 2 and node 3 transmit the same information to the controller at the same time. This could be achieved through in any of the first three cooperative transmission scenarios described for the previous technique. Note the retransmission schedule in this case is not explicitly built. It is actually duplicating the uplink schedule for recovering failed transmissions. Moreover, the successful transmissions in the previous round may not need to be retransmitted (duplicated). This would potentially eliminate any conflicts in the timeslots used for cooperative transmissions.

Case 2

Assume that, at the end of the transmission schedule, the 2nd transmission from node 2 and the 2nd transmission from node 3 were missing at the controller. The controller generate a G-NACK indicating the missing transmissions along with the respective timeslots. After receiving the G-NACK from the controller, both nodes 2 and 3 check their buffers for missing transmissions. We assume that missing transmission from node 3 is available in its buffer while that from node 2 is not. Therefore, node 3 generates an empty G-NACK for node 5. However, node 2 generates a G-NACK indicating the missing transmission from node 4 along with the respective timeslot information. The G-NACK from node 2 informs node 6 to act as a relay for node 4 in timeslot t0. Therefore, both node 4 and node 6 cooperatively transmit to node 2 through any of the first three scenarios described for the previous technique. Similarly, node 2 acts as a relay for node 3 in timeslot t2. However, note that node 3 cannot act as a relay for node 2 in this case as the latter did not transmit in timeslot t4 of the original transmission schedule. Therefore, node 2 performs a SNC operation in timeslot t4, after receiving the information from node 4 in timeslot t0 of the retransmission schedule.

Note that the schedule extrapolation technique achieves high reliability through cooperative multi-user diversity while providing deterministic performance. However, it may not fully exploit all cooperative retransmission opportunities in a flexible manner as the retransmission scheduling technique. Besides, some overhead is generated by incorporating extra information in the G-NACKs.

Method for Relay Selection

Figure 6:
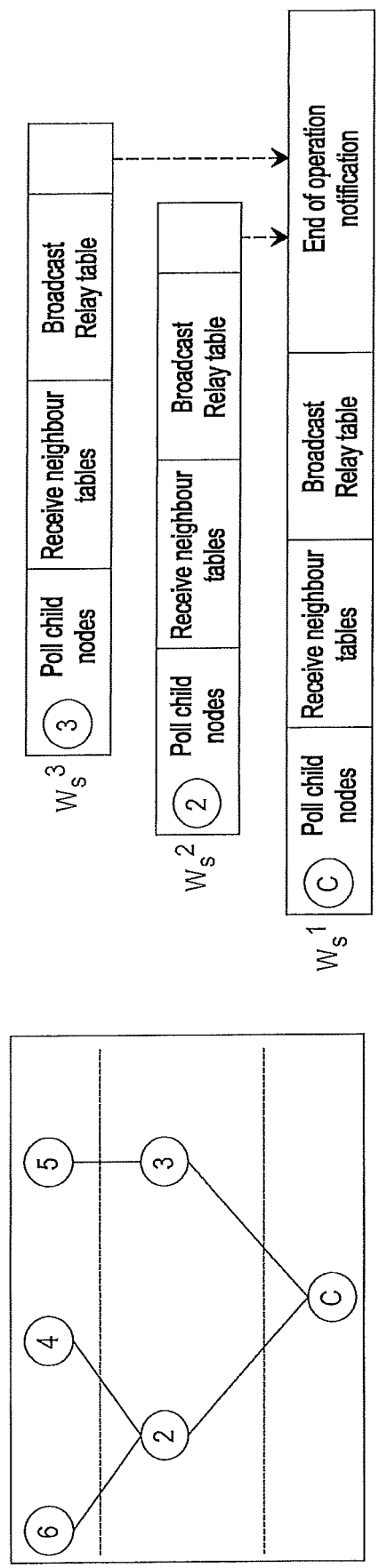
FIG. 6 shows an offline relay selection method.

In order to perform the relay selection function to realise cooperative transmissions, GALLOP relies on a simple (offline) method based on link-level measurements which is illustrated in FIG. 6. Initially, the controller polls each of its child nodes by sending an empty RFS message on the default signalling channel. The child node responds with an empty ASG message. The neighbouring nodes, which successfully receive the ASG messages, and are associated with the controller, add the ID of the polled device along with the uplink received signal-to-noise ratio (SNR) in a neighbour table. To reduce the overhead, each child node only records M strongest neighbours. Once the controller has polled all the child nodes, it transmits a downlink signalling message which includes a schedule information (on the default signalling channel) for the child nodes. Based on the schedule information, each child node reports its neighbour table to the controller. The controller, upon receiving the neighbour tables, selects a relay node for each of its child node by computing a relay table. Essentially, this encompasses finding a node with the best SNR from every child node's neighbour table. The controller broadcasts the relay table on the default signalling channel. The relay table informs the child nodes of the controller of the selected relay that would be used for cooperative transmissions. The selected relay nodes listen to transmission from the nodes they are designated as relaying information for and retain the transmissions.

After receiving the relay table from the controller, each child node (which is not a leaf node) repeats the same operation for its associated child nodes on a different channel. The controller allocates distinct channels to all of its non-leaf child nodes. The channel information can be embedded into the schedule information which was used for receiving the neighbour tables from the child nodes. Each non-leaf child node of the controller will perform the same steps as the controller for relay selection function. The process continues in the downward direction with each parent node allocating distinct channels to its child nodes for performing the relay selection operation. If the child nodes of a parent node are all leaf nodes, it notifies its own parent of the end of relay selection operation by transmitting an uplink signalling message on the respective channel. The process finishes once the controller has received an uplink signalling message, indicating the end of relay selection operation, from all of its non-leaf child nodes.

In another embodiment the relay selection functionality is achieved in an online manner. In the embodiment nodes overhear from neighbouring nodes during the downlink and uplink transmission phases. If a node successfully overhears from a neighbouring node (with the same default parent as its own), with a good SNR (i.e., SNR is greater than a certain threshold), it notifies the parent node that it will act as a relay node. This information can be piggybacked on the uplink transmission of a cycle. The parent node can send the confirmation of relay selection on the next downlink transmission.

The above described techniques of embodiments efficiently handle retransmissions while balancing the ODR trade-off in multi-hop control networks.

The schedule duplication technique achieves deterministic performance and generates no overhead. However, it may not provide very high reliability, especially under extremely challenging environments.

The retransmission scheduling technique achieves very high reliability due to cooperative multi-user diversity and opportunistic network coding techniques. However, it generates an overhead of building a retransmission schedule. The signalling associated with building the schedule leads to some loss of determinism.

The schedule extrapolation technique achieves very high reliability through cooperative multi-user diversity and opportunistic network coding techniques while providing deterministic performance. Further, it generates no overhead of building the retransmission schedule.

Besides improving reliability, all techniques improve the throughput of multi-hop wireless networks.

Figure 7A:
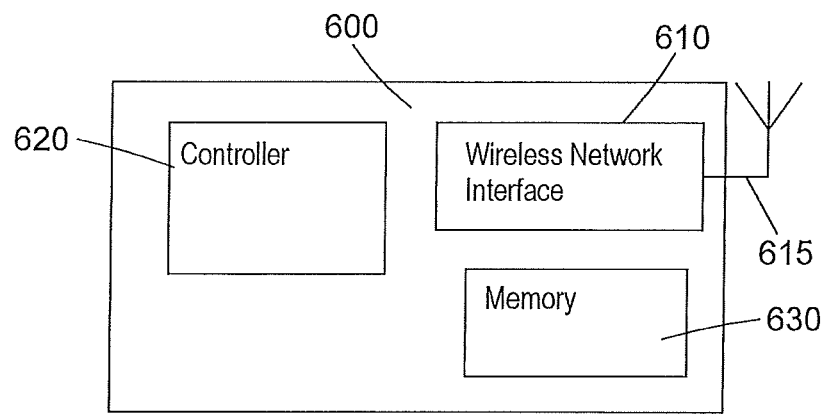
FIG. 7A shows an example of a wireless node.

FIG. 7A shows an example of a wireless node according to an arrangement. This is capable of performing the functions of any of the wireless nodes or slave devices described herein.

The wireless node 600 comprises a wireless network interface 610, an antenna 615, memory 630 and a controller 620. The wireless interface 610 is configured to send and receive wireless signals via the antenna 615 to communicate with other wireless devices. The controller 620 is configured to control the wireless node 600 to perform the functions described herein.

The memory 630 stores computer executable code which, when executed by the controller 620, causes the controller 620 to enact the steps described herein to transmit, receive and process data. The memory 630 may comprise a record of overheard transmissions, messages and/or scheduled transmissions.

Figure 7B:
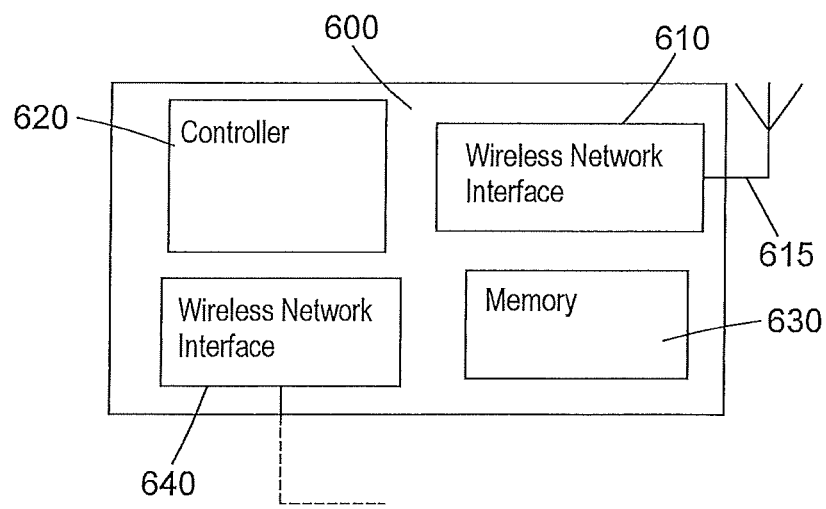
FIG. 7B shows an example of a central node.

FIG. 7B shows a central node according to an arrangement. The central node is the same as the wireless node 600 other than it has a wired network interface 640 for communication with devices external to the wireless network. This allows the central node to perform the functions of a sink node (by relaying transmissions out of the network) or a control node (by receiving instructions for controlling a network of slave devices, and relaying their responses back).

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method for re-transmitting data from a first network node of a first communication apparatus in a multi-hop wireless network toward a control node of a control apparatus, wherein the first network node is a child node to a corresponding parent node of a second communication apparatus, the method comprising:

transmitting, by the first communication apparatus, data toward the control apparatus via at least one parent node including the second communication apparatus according to a first transmission schedule determined by the control apparatus; and re-transmitting, by the first communication apparatus, the data towards the control apparatus via the at least one parent node including the second communication apparatus according to second transmission schedule determined by the control apparatus, when the data previously transmitted by the first communication apparatus is failed to be delivered to the control apparatus.

2. The method according to claim 1, further comprising:

following an unsuccessful attempt to transmit the data according to the first transmission schedule; and receiving, by the first communication apparatus, an indication of the data or of a network node of origin of the data from the control apparatus via the at least one parent node including the second communication apparatus, wherein the data had been scheduled to be received but the data failed to be delivered to the control apparatus in the unsuccessful attempt to transmit the data.

3. The method according to claim 2, wherein a priority is assigned to each of network nodes in the multi-hop wireless network and wherein a network node, upon receipt of the indication, determines that re-transmission of the data is required, and requests allocation of one or more uplink data transmission slots in accordance with the priority.

4. The method according to claim 2, wherein the first network node is paired with a relay node, the relay node being a network node that can observe transmissions from the first communication apparatus, said relay node being spaced apart from the control node by the same number of hops as the first network node, wherein network nodes including the first network node and the relay node are configured to re-use the first transmission schedule as the second transmission schedule and wherein only network nodes that are required to re-transmit the data participate in transmission in the second transmission schedule.

5. The method according to claim 4, wherein a network node, upon receipt of the indication, determines that the relay node of a network node is required to re-transmit data and transmits the data that is to be re-transmitted from its buffer in a transmission time slot of the network node that is required to re-transmit the data.

6. The method according to claim 2, wherein parent and child nodes negotiate non-conflicting transmission timeslots for re-transmission.

7. The method according to claim 1, wherein the first network node is paired with a relay node, the relay node being a network node that can observe transmissions from the first communication apparatus, said relay node being spaced apart from the control node by the same number of hops as the first network node, wherein the parent node sends an instruction to the relay node to transmit the data that is to be re-transmitted to the parent node simultaneously with a re-transmission of the data by the first communication apparatus, and wherein the relay node transmits, according to the instruction, the data simultaneously with a re-transmission of the data by the first communication apparatus.

8. A non-transitory computer storage medium storing computer executable instructions for performing, when executed by a processor, the method according to claim 1.

9. A method for re-transmitting data from a first network node of a first communication apparatus in a multi-hop wireless network toward a control node of a control apparatus, wherein the first network node is a child node to a corresponding parent node of a second communication apparatus, the method being performed by a relay node of a second communication apparatus, the relay node being a network node that is paired with the first network node, the method comprising:

upon receipt of an indication the first network node is required to re-transmit data, transmitting said data from a buffer to a joint parent node of the relay node and the first network node simultaneously with a re-transmission of said data by the first communication apparatus.

10. The method according to claim 9, further comprising: receiving an indication of a time slot to be used for re-transmission from said joint parent node.

11. A non-transitory computer storage medium storing computer executable instructions for performing, when executed by a processor, the method according to claim 9.

12. A multi-hop wireless network comprising:
a control node of a control apparatus and a first network node of a first communication apparatus, wherein the first network node is a child node to a corresponding parent node of a second communication apparatus, the first communication apparatus transmits data toward the control node via at least one parent node including the second communication apparatus according to a first transmission schedule determined by the control node; and
the first communication apparatus re-transmits the data towards the control apparatus via the at least one parent node including the second communication apparatus according to a second transmission schedule determined by the control apparatus, wherein the data previously transmitted by the first communication apparatus is failed to be delivered to the control apparatus.

13. The multi-hop wireless network according to claim 12, wherein the control apparatus is further configured to, following an unsuccessful attempt to transmit the data according to the first transmission schedule, transmit an indication of the data or of a network node of origin of the data, wherein the data had been scheduled to be received but failed to be delivered to the control apparatus in the unsuccessful attempt to transmit the data.

14. The multi-hop wireless network according to claim 13, wherein a priority is assigned to each of network nodes in the multi-hop wireless network and wherein a network node is configured to, upon receipt of the indication, determine that re-transmission of the data is required, and request allocation of one or more uplink data transmission slots in accordance with the priority.

15. The multi-hop wireless network according to claim 13, wherein the first network node is paired with a relay node, the relay node being a network node that is configured to observe transmissions from the first communication apparatus, said relay node being spaced apart from the control node by the same number of hops as the first network node, wherein network nodes including the first network node and the relay node are configured to re-use the first transmission schedule as the second transmission schedule and wherein only network nodes that are required to re-transmit the data participate in transmission in the second transmission schedule.

16. The multi-hop wireless network according to claim 15, wherein a network node, upon receipt of the indication, determines that the relay node of a network node is required to re-transmit data and transmits the data that is to be re-transmitted from its buffer in a transmission time slot of the network node that is required to re-transmit the data.

17. The multi-hop wireless network according to claim 13, wherein parent and child nodes negotiate non-conflicting transmission timeslots for re-transmission.

18. The multi-hop wireless network according to claim 12, wherein the first network node is paired with a relay node, the relay node being a network node, that can observe transmissions the first communication apparatus, said relay node being spaced apart from the control node by the same number of hops as the first network node, wherein the parent node sends an instruction to the relay node to transmit the data that is to be re-transmitted to the parent node of the first network node simultaneously with a re-transmission of the data by the first communication apparatus, and wherein the relay node transmits, according to the instruction, the data simultaneously with a re-transmission of the data by the first communication apparatus.

* * * * *